H. P. GAGE.
GLASS.
APPLICATION FILED JULY 21, 1916.

1,295,299.

Patented Feb. 25, 1919.

Inventor
Henry P. Gage
By Dwyer Cole
Attorney

UNITED STATES PATENT OFFICE.

HENRY PHELPS GAGE, OF CORNING, NEW YORK, ASSIGNOR TO CORNING GLASS WORKS, A CORPORATION OF NEW YORK.

GLASS.

1,295,299.   Specification of Letters Patent.   Patented Feb. 25, 1919.

Application filed July 21, 1916.   Serial No. 110,512.

*To all whom it may concern:*

Be it known that I, HENRY PHELPS GAGE, a citizen of the United States of America, and a resident of Corning, New York, have invented certain new and useful Improvements in Glass, of which the following is a specification.

My invention relates to a glass to be used in connection with an artificial light source to produce an illumination which approximates in its energy distribution to that of day light. It has been heretofore proposed, for the general purposes stated, to incorporate in a potash lime glass salts of copper, cobalt and nickel. While such a glass is more or less satisfactory for the purposes stated when used in connection with certain artificial light sources, certain objections are attendant to the use of the nickel, in that nickel in a glass composition of the character specified has irregularities in its absorptive curve, and is too strong in its absorption of the rays of the shorter wave length (*i. e.* those toward the violet end of the spectrum) to give a proper distribution of transmission when a nitrogen filled tungsten lamp is used as the source of illumination. I have discovered that manganese, while it has generally speaking the same absorptive effects as nickel, has a much smoother curve, that is to say, it lacks the absorptive irregularities present in nickel. I have further found that when using manganese the transmission for the shorter wave lengths is increased by the use of potash lead glass as the carrier for the manganese.

My invention therefore consists generally of a glass for the purposes stated, containing copper, cobalt and manganese, and more specifically of a potash lead glass containing copper, cobalt and manganese.

Referring to the accompanying drawings,—

Figure 3:
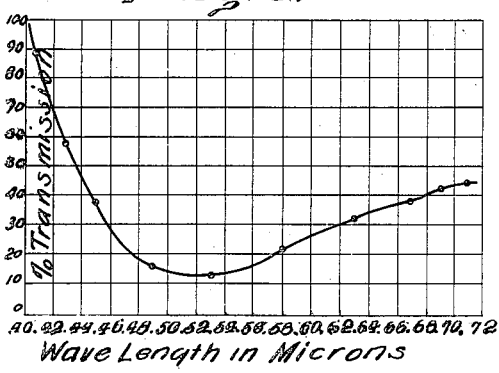
Fig. 3 is a similar diagram of transmission through the same glass containing a certain percentage of manganese.
Figure 4:
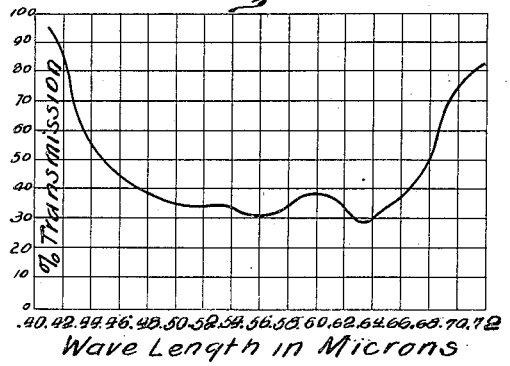
Fig. 4 is a similar diagram of transmission through the same glass containing a certain proportion of nickel.
Figure 5:
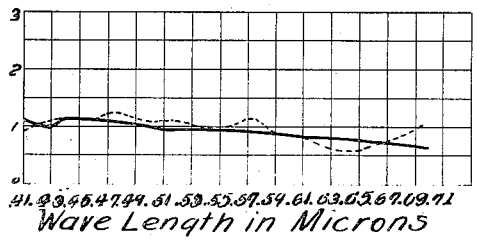
Fig. 5 represents in dotted lines the distribution of energy in the spectrum of the light from a nitrogen filled tungsten filament lamp after being transmitted through a plate 5.65 mm. thick of glass embodying this invention, and in full lines the actual distribution of energy in the visible spectrum of sunlight.

The glass composition, the curves of which are represented in Figs. 1, 2, 3, 4 and 5, is one having the formula $K_2O; PbO; 5SiO$ with oxids of the specified elements added, and it will be understood that the diagrammatic representations of these figures are for the purposes of illustration. The dotted line curve of Fig. 5 is a curve that has been carefully calculated and is correct under the conditions stated.

As stated above, it has been proposed to incorporate in a single glass salts of the different elements, each of which salts has the property of absorbing in different proportions certain wave lengths of the spectrum, and to so select these salts that the sum of the absorptive powers in the different parts of the spectrum will result in such absorption as will modify in the desired manner the light from the artificial source transmitted through the glass, and thus cause the distribution of energy in such transmitted light to approximate the distribution of energy in the sun light.

Figure 1:
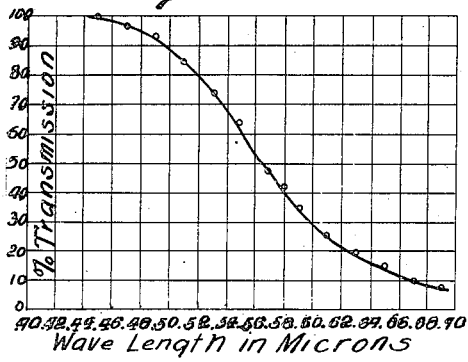
Figure 1 is a diagrammatic representation of the transmission of light through a potash lead glass containing a certain percentage of copper.

Referring to Fig. 1, it will be noted that with a glass of the given composition containing copper, the light of the shorter wave lengths is nearly completely transmitted, while light from the opposite end of the spectrum is nearly completely absorbed, the intermediate curve being smooth and without irregularities.

Figure 2:
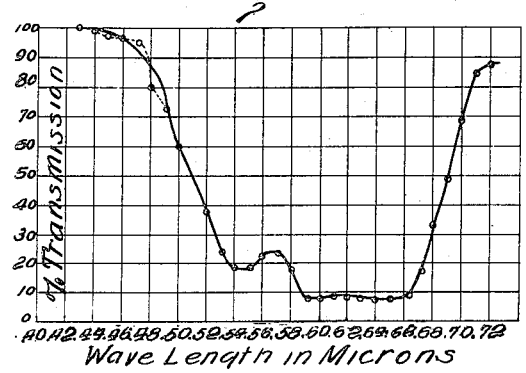
Fig. 2 is a similar diagram of transmission of light through the same glass, but containing a certain percentage of cobalt.

Referring to Fig. 2, it will be noted that the same glass, but containing cobalt, transmits practically all of the light below .45 microns, has large absorptive powers of wave lengths between .52 and .68 microns and has lesser absorptive power of wave lengths above .70 microns. The curve, however, has some irregularities.

Referring to Fig. 3, it will be noted that the same glass composition, but containing manganese, has a regular curve of transmission with the greatest absorption at wave length about .52 microns.

A single glass containing copper, cobalt and manganese has a transmission in a given part of the spectrum which is the product of the transmission of the several coloring matters in that part of the spectrum; except as modified by the reaction of such matters upon each other, if such reaction exists. I find for instance, that in the copper-cobalt-manganese combination, a higher percentage of manganese is required than would be indicated by its absorptive curve when used by itself.

It will be noted by comparing the curves of Fig. 3 and Fig. 4 that nickel causes the glass to have irregularities in its absorptive curve. The curve of transmission of the nickel glass shown in Fig. 4, instead of having the smooth shape of the corresponding curve shown in Fig. 3 for manganese, has two distinct humps, one at .56 microns and the other at .63 microns. The use of nickel, therefore, in a glass containing other absorptive elements instead of producing the smooth curve will tend to produce a more irregular curve.

As stated, I found that when manganese is used it is desirable to use a potash lead glass, as the use of manganese in a potash lead glass results in a greater transmission of light toward the violet end of the spectrum than does the use of manganese in a potash lime glass. This is a distinct advantage, in that artificial sources of illumination are, as well known, deficient in the violet.

Having thus stated what I consider to be my invention, I will now give for purposes of illustration, but not of limitation, a specific disclosure of a light filter plate falling within such broad invention.

As a glass composition to contain the mineral ingredients before named I melt together,—

49 lbs. sand.
    36 " lead oxid $(Pb_3O_4)$
    23 " pearlash $(K_2CO_3+H_2O)$
    4.2 " potassium-nitrate $(KNO_3)$ To the above batch (preferably before melting) is added,—

4 oz. cupric oxid $(CuO)$
    3 grams (.1 oz.) cobalt-sesquioxid $(Co_2O_3)$
    7¾ oz. manganese-dioxid $(MnO_2)$ When the glass is properly fined it may be taken out in ordinary ways and finished to shape and annealed. Care, however, must be exercised in the melting and refining, as the spectroscopic properties of the manganese are effected by irregularities in heating. Thus a melt containing the proportion of the several ingredients above named may in practice result in a glass that is too green, due to overheating, or too pink if the heat has not been such as the above formula is calculated for. If too pink, its intensity in this direction may be reduced by subsequent heating and annealing.

To insure the results aimed at by me, I find it desirable to make a spectroscopic examination of the glass from each melt, or to compare it with a standard glass having a transmission curve indicated in Fig. 5 of this application.

It is obvious that for certain purposes it might be desired to depart from the transmission curve shown in Fig. 5, and that this may be done by varying the proportion of the coloring oxids in the above composition, and that where lamps other than the nitrogen filled tungsten lamp are used, it may be further desirable to modify such proportions to produce the transmission curve indicated in Fig. 5. Again for certain purposes it may be permissible to dispense with the cobalt salt and use merely the copper and manganese salts.

The use of manganese as a coloring agent for glass has, prior to this invention, been subject to the objection that such a glass tends to lose its color when exposed to actinic rays. Severe tests of a glass such as described herein show, however, that while the color and absorptive power thereof may be modified by temperatures higher than those to which a filter glass is exposed in use, actinic rays, without such high temperatures, will not change its color or absorptive power. While this certainly is the result of the glass composition employed, I am unable to specify the direct cause thereof.

Having thus described my invention, what I claim and desire to secure by Letters Patent is,—

1. A potash glass for use as a filter to produce day light effects from artificial sources of illumination containing copper, cobalt and manganese.

2. A lead potash glass for use as a filter to produce day light effects from artificial sources of illumination containing copper, cobalt and manganese.

3. A potash glass for use as a filter to produce day light effects from artificial light sources containing copper, and manganese and substantially free from soda.

4. A potash lead glass for use as a filter to produce day light effects from artificial light sources containing copper and manganese.

In testimony whereof I have signed my name this 18 day of July, 1916.

HENRY PHELPS GAGE.

In the presence of—
    AMBROSE J. HAAR,
    S. J. MAYER.